US008497000B2

(12) United States Patent
Kwon et al.

(10) Patent No.: US 8,497,000 B2
(45) Date of Patent: Jul. 30, 2013

(54) X-RAY INDUCED WETTABILITY MODIFICATION

(75) Inventors: Yong Bum Kwon, Pohang (KR); Byung Mook Weon, Pohang (KR); Kyu Hwang Won, Pohang (KR); Jung Ho Je, Pohang (KR)

(73) Assignee: Postech Academy-Industry Foundation (KR)

( * ) Notice: Subject to any disclaimer, the term of this patent is extended or adjusted under 35 U.S.C. 154(b) by 778 days.

(21) Appl. No.: 12/357,761

(22) Filed: Jan. 22, 2009

(65) Prior Publication Data

US 2010/0128847 A1 May 27, 2010

(30) Foreign Application Priority Data

Nov. 27, 2008 (KR) .................. 10-2008-0119055

(51) Int. Cl.
*B05D 3/02* (2006.01)
(52) U.S. Cl.
USPC ............... 427/551; 427/553; 427/595; 378/1; 250/492.1; 250/492.2
(58) Field of Classification Search
USPC ................ 427/458, 551, 595; 378/64, 66, 68; 250/492.1
See application file for complete search history.

(56) References Cited

U.S. PATENT DOCUMENTS 3,249,430 A * 5/1966 Wright et al. .................... 430/54
3,543,025 A * 11/1970 Stanton .......................... 430/55
2009/0155450 A1 * 6/2009 Je et al. ............................ 427/8

FOREIGN PATENT DOCUMENTS

WO 2007-049280 5/2007

OTHER PUBLICATIONS

Kwon et al. "X-ray-Induced Changes in Wettability", Langmuir 2009,25, pp. 1927-1929.*
Sun et al "Photoinduced Surface Wettability Conversion of ZnO and TiO2 Thin Films". Journal of Physical Chemistry B. 2001, No. 105 pp. 1984-1990.*
Miyauchi et al. "Photoinduced Hydrophilic Conversion of TiO2/WO3 Layered Thin Films". Chem. Mater. 2002, No. 14, pp. 4714-4270.*
Mintas et al. Surface Charging of Zinc Oxide During XPS Examination. Croatica Chemica Acta vol. 54 (4) pp. 403-406 (1981).*
Wu, Corina. "A Miniature Synchrotron". Technology Review. MIT. Published Feb. 4, 2008 online at http://www.technologyreview.com/biomedicine/20149/.*
Sprawls's X-ray Tube, Online as of Dec. 17, 2005 http://www.sprawls.org/ppmi2/XRAYPRO/#THE X-RAY TUBE.*
Ley et al. "Total valence-band densities of states of III-V and II-VI compounds from x-ray photoemission spectroscopy". Physical Review B vol. 9 No. 2 (1974).*

* cited by examiner

*Primary Examiner* — Dah-Wei Yuan
*Assistant Examiner* — Jose Hernandez-Diaz
(74) *Attorney, Agent, or Firm* — Harness, Dickey & Pierce, P.L.C.

(57) ABSTRACT

Disclosed is a method for modifying wettability of a surface of an inorganic material, the method comprising the steps of: preparing an inorganic material with a surface; and charging the surface of the inorganic material with positive surface charges obtained from photoelectron-emission by an X-ray irradiation to the surface of the inorganic material.

5 Claims, 4 Drawing Sheets

X-RAY INDUCED WETTABILITY MODIFICATION

BACKGROUND OF THE INVENTION

1. Field of the Invention

The present invention relates to a method for modifying wettability of a surface of an inorganic material. More specifically, the invention relates to a method for modifying wettability of a surface of an inorganic material by an X-ray irradiation to the surface of the inorganic material.

2. Background of the Related Art

Controlling and modifying the wettability on solid surface are important in many industrial applications. In particular the dynamic tuning of the wettability to superhydrophobicity (contact angle (CA)>150°) or superhydrophilicity (CA<10°) by external stimuli is a subject of keen interest because of its potential applications to many intelligent devices such as biosensors, microfluidic devices, and intelligent membranes.

Various external stimuli such as pH, light irradiation, electric field, and temperature have been reported for dynamic tuning of wettability. Among them, light irradiation as remote stimulus is especially attractive because of individually addressable switching, remote controllability, and easy selectivity of wavelength.

Owing to their good chemical and mechanical stabilities, inorganic materials can be applied, if their wettability triggered by UV/visible irradiation, to a variety of applications such as Si-based μ-TAS (micro-total-analytical system), $Al_2O_3$-modified microcantilevers (MCLs), and smart windows. However smooth surfaces of inorganic materials except for ZnO, $TiO_2$, and $WO_3$ usually show limited variation of wettability by UV/visible irradiation. Nanostructures with rough surfaces are, therefore, introduced to enhance the wettability variation.

However the fabrication of nanostructures is often accompanied by complex processes and shows poor reproducibility. Furthermore it is not easy to fabricate nanostructures on complex structures. A challenging demand is, therefore, to find a new light irradiation that enables to universally improve the wettability variation on smooth surfaces of inorganic materials.

SUMMARY OF THE INVENTION

Accordingly, the present invention has been made in an effort to solve the problems occurring in the prior art. It is an object of the invention to provide a method for modifying wettability of a surface of an inorganic material by an X-ray irradiation to the surface of the inorganic material.

To achieve the above object, according to an aspect of the invention, there is provided a method for modifying wettability of a surface of an inorganic material, the method comprising the steps of: preparing an inorganic material with a surface; and charging the surface of the inorganic material with surface charges obtained from photoelectron-emission by an X-ray irradiation to the surface of the inorganic material.

Preferably, the method further comprises discharging the surface charges from the surface so as to recover the wettability of the surface of the inorganic material after the X-ray irradiation.

Preferably, discharging the surface charges is performed by immersion of the surface of the inorganic material in deionized water.

Preferably, the X-ray irradiation is a synchrotron hard X-ray irradiation in the range of 10 to 60 keV.

Preferably, the X-ray irradiation induces surface potential V(t) given by the following relation:

$$V(t) \approx V(\infty)[1-\exp(-t/\tau)] \quad (1)$$

where t is an X-ray irradiation time, $V(\infty)$ is an infinity potential and $\tau$ is a time constant.

Preferably, the X-ray irradiation induces wetting behavior given by the following equation:

$$\cos\theta = \cos\theta_o + \frac{\epsilon_i \epsilon_o V(t)^2}{2\gamma_{lv} d} \quad (2)$$

where, $\theta$ and $\theta_o$ are wetted and static contact angles, respectively, t is an X-ray irradiation time, $\epsilon_i$ and $\epsilon_o$ are dielectric permittivities of the inorganic material and vacuum, respectively, d is the thickness of the inorganic material, and $\gamma_{lv}$ is initial value of the liquid-vapor surface tension before X-ray irradiation.

Preferably, a relation between the wettability and the X-ray irradiation is given by the following:

$$\cos\theta \propto [1-\exp(-t/\tau)]^2 \quad (3)$$

where $\theta$ is a wetted contact angle, t is an X-ray irradiation time, and $\tau$ is a time constant.

Preferably, the inorganic material is selected from the group consisting of oxides, sulphides, nitrides, semiconductors, and steels.

Preferably, the inorganic material is selected from the group consisting of ZnO, p-Si, Sapphire, $SrTiO_3$, TiN, ZnS, and stainless steel.

Preferably, a transition of the wettability is reversible.

DETAILED DESCRIPTION OF THE PREFERRED EMBODIMENT

In this invention, we first report that hard X-ray irradiation induces wettability modifications in a variety of inorganic materials. We observe that the smooth surfaces of all tested inorganic materials change to superhydrophilic wettability by X-ray irradiation. We reveal that the superhydrophilic transition is due to the accumulation of positive surface charges on the surface by photoelectron-emission. The wettability quickly recovers to the initial state within several minutes of immersion in deionized water by discharging mechanism. The X-ray induced wettability modification is reversible.

A variety of inorganic materials such as ZnO, ZnS, p-Si, $Al_2O_3$, $SrTiO_3$, TiN, stainless steel etc. have been tested in this invention. Synchrotron hard X-ray (10-60 keV) in Pohang Light Source (PLS) 7B2 beamline was used to induce the wettability modification. The wettability was evaluated from the contact angle of water droplet. Electrostatic force microscopy (EFM) (XE-100, USA) was used to measure the surface potential.

Figure 1:
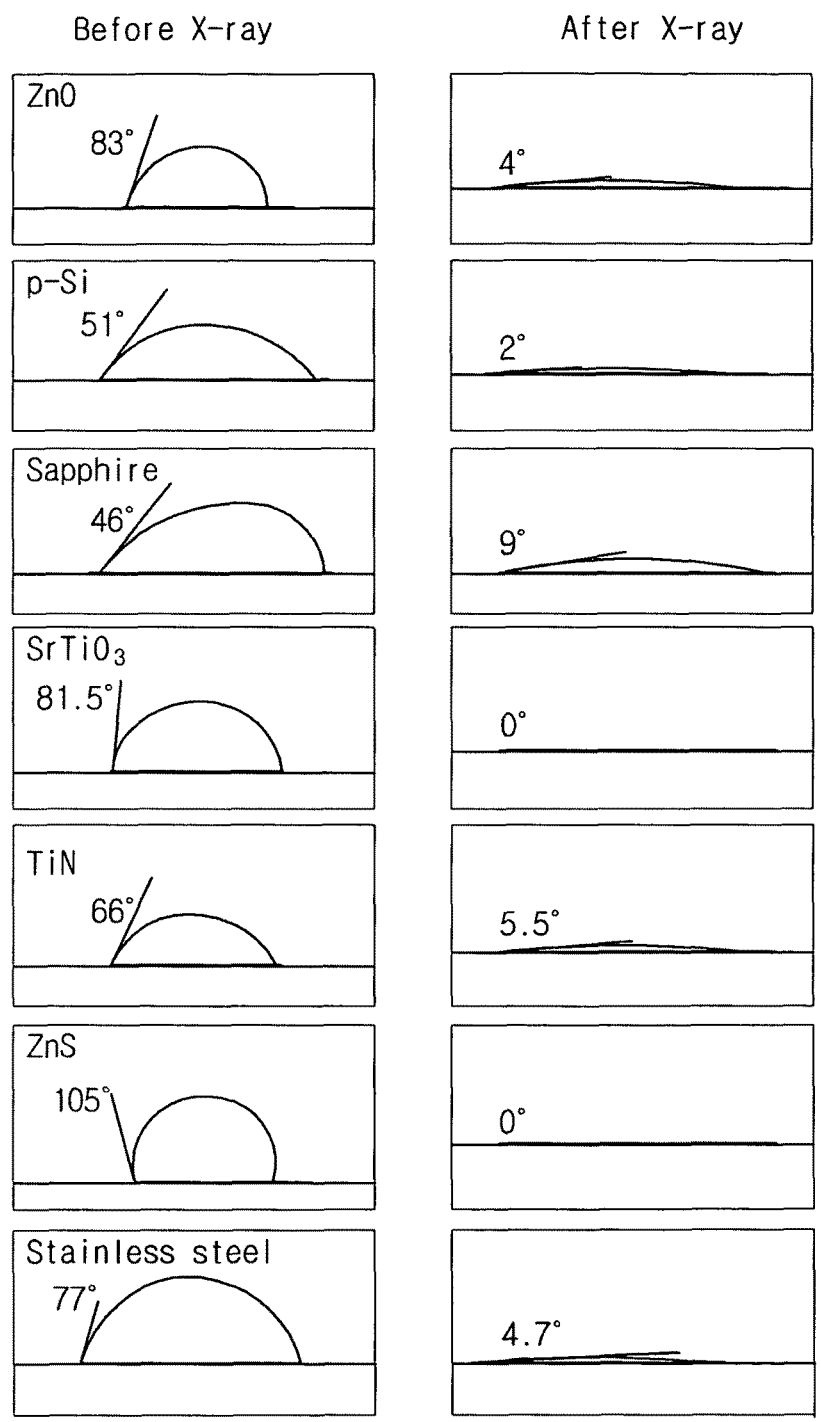
FIG. 1 Shows superhydrophilic transition in a variety of inorganic materials by X-ray irradiation.

FIG. 1 shows the variation of water contact angles on ZnO, ZnS, p-Si, $Al_2O_3$, $SrTiO_3$, TiN, and stainless steel. Interestingly superhydrophilic transition occurs in all the tested inorganic materials when irradiated by synchrotron hard X-ray (10-60 keV). Some metallic oxides of CuO, $Cr_2O_3$, and $Ag_2O$ also showed similar X-ray induced transition (data not shown). In sharp contrast that UV-induced transition occurs only in a few oxide surfaces, all the inorganic materials tested show the superhydrophilic transition by X-ray irradiation, no matter whether they are oxide, sulphide, nitride, or even semiconductor. It is also worth to note that the response time is relatively rapid (<10 min) for ZnS, ZnO, and $SrTiO_3$. These results suggest that hard X-ray irradiation might be a good method for a wettability transition to superhydrophilicity in most inorganic materials.

The X-ray induced superhydrophilicity of inorganic materials is attributed to surface charging during the irradiation. In general positive surface charges are accumulated on X-ray irradiated surface by photoelectron-emission. The surface potential induced by X-ray irradiation, V(t), shows an exponential evolution with irradiation time, as follows:

$$V(t) \approx V(\infty)[1-\exp(-t/\tau)] \quad (1)$$

where t is the X-ray irradiation time, $V(\infty)$ is the infinity potential, and $\tau$ is the time constant. The wetting behavior induced by surface charging is given by the well-known Young-Lippmann equation:

$$\cos\theta = \cos\theta_o + \frac{\varepsilon_i \varepsilon_o V(t)^2}{2\gamma_{lv} d} \quad (2)$$

where $\theta$ and $\theta_o$ are the wetted and static contact angles, respectively, t is the X-ray irradiation time, $\varepsilon_i$ and $\varepsilon_o$ are the dielectric permittivities of the inorganic material and vacuum, respectively, d is the thickness of the inorganic material, and $\gamma_{lv}$ is the initial value of the liquid-vapor surface tension before X-ray irradiation. From Eqs. (1) and (2), we derive a simple relation between the wettability and X-ray irradiation time as follows:

$$\cos\theta \propto [1-\exp(-t/\tau)]^2 \quad (3)$$

where $\theta$ is the wetted contact angle, t is the X-ray irradiation time, and $\tau$ is the time constant.

This relation shows that the wettability exponentially changes with the irradiation time. Indeed, as shown in the contact angle (CA) behavior on ZnO surface [FIG. 2(a)], the wettability follows an exponential evolution with irradiation time. The fitting by Eq. (3) (dashed line) is well matched to the contact angle data. The exponential behavior of the wettability with irradiation time is also observed in all the other inorganic materials tested (data not shown). These results indicate that X-ray induced wettability transition of inorganic materials is due to surface charging during X-ray irradiation.

Figure 2:
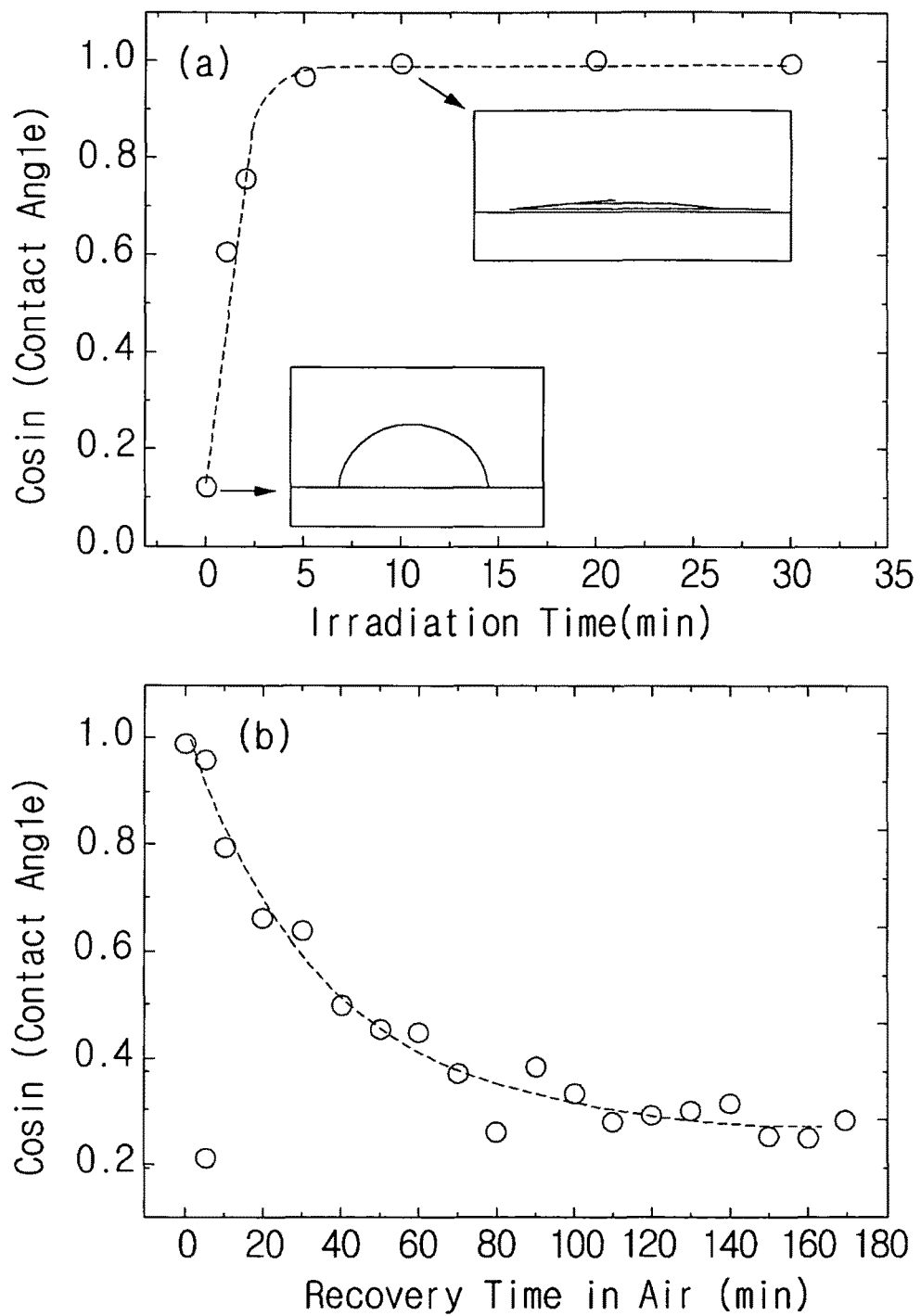
FIG. 2 shows (a) wettability transition dynamics of ZnO surface during X-ray irradiation (Note that the transition follows an exponential behavior: $\cos\theta \approx [1-\exp(-t/\tau)]^2$) and (b) contact angle recovery behavior of irradiated ZnO surface with storage time at ambient air condition.

The recovery rate at ambient air condition is relatively slow, as shown in FIG. 2(b). It takes about 80 min for the full recovery, which is, nevertheless, much faster than that of smooth surfaces in UV-induced modification. The recovery rate might depend on discharging process of accumulated surface charges. Interestingly the superhydrophilic wettability quickly recovers to the initial state within 1 min of immersion in deionized water for ZnO (several minutes for the other inorganic materials), possibly by the accelerated discharging in the water.

Figure 3:
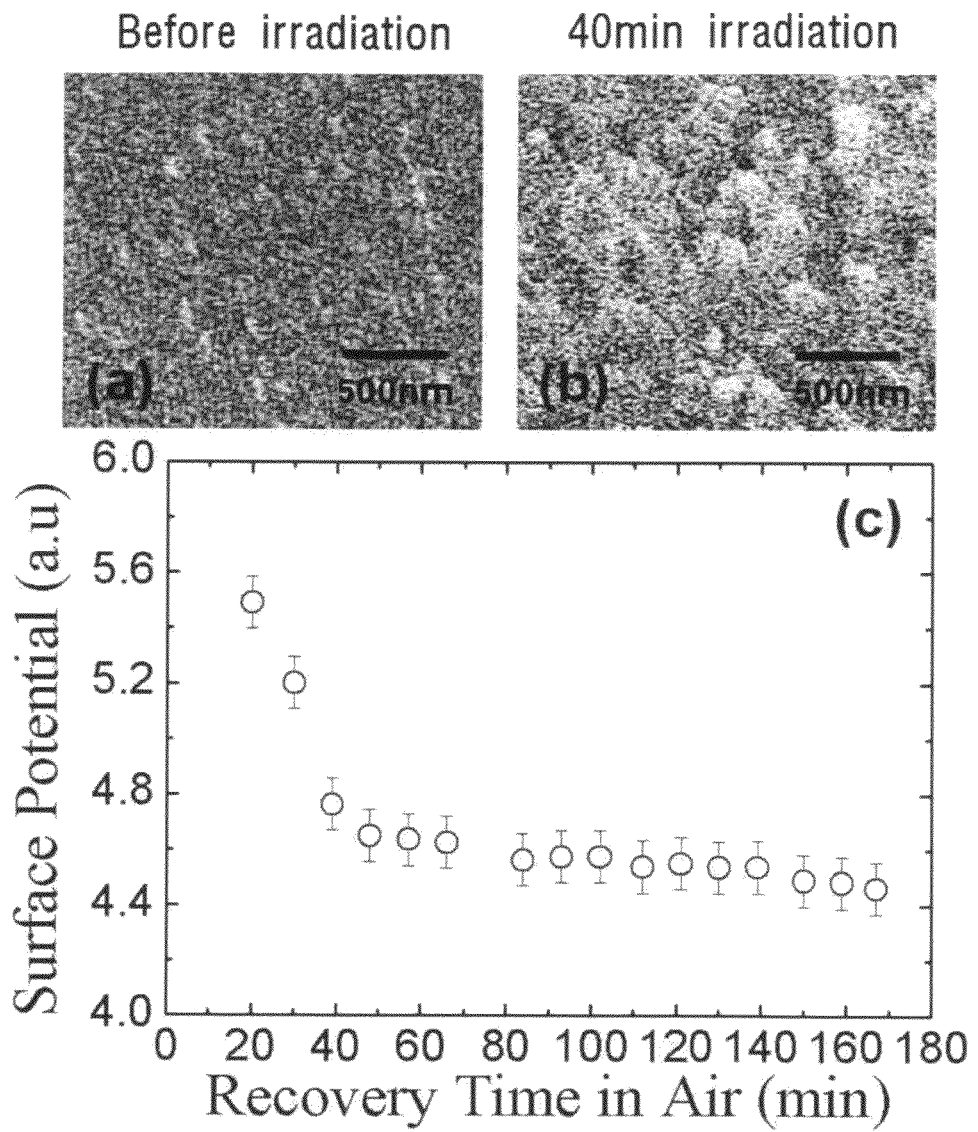
FIG. 3 shows dc-EFM surface image of (a) before irradiation, (b) after 40-min irradiation, and (c) gradual decrease of surface potential with storage time at ambient condition after 40-min irradiation.

The surface charging and discharging in X-ray induced modification are confirmed through a surface potential measurement by dc-EFM. FIG. 3(a) and (b) show the surface potential images of the ZnO surface at ambient air condition before (a) and after (b) the irradiation of 40 min. (Here the image of FIG. 3(b) was actually taken by a lapse of 30 min after the irradiation.) The image data demonstrate that the surface potential is greatly increased by the irradiation. This clearly indicates that the superhydrophilic transition is induced by the surface charging process during the irradiation. The surface potential is gradually reduced at ambient air condition with the recovery time up to about 80 min as seen in FIG. 3(c), consistent with the gradual recovery of contact angle in FIG. 2(b). This indicates that the recovery is due to discharging process of accumulated surface charges.

Figure 4:
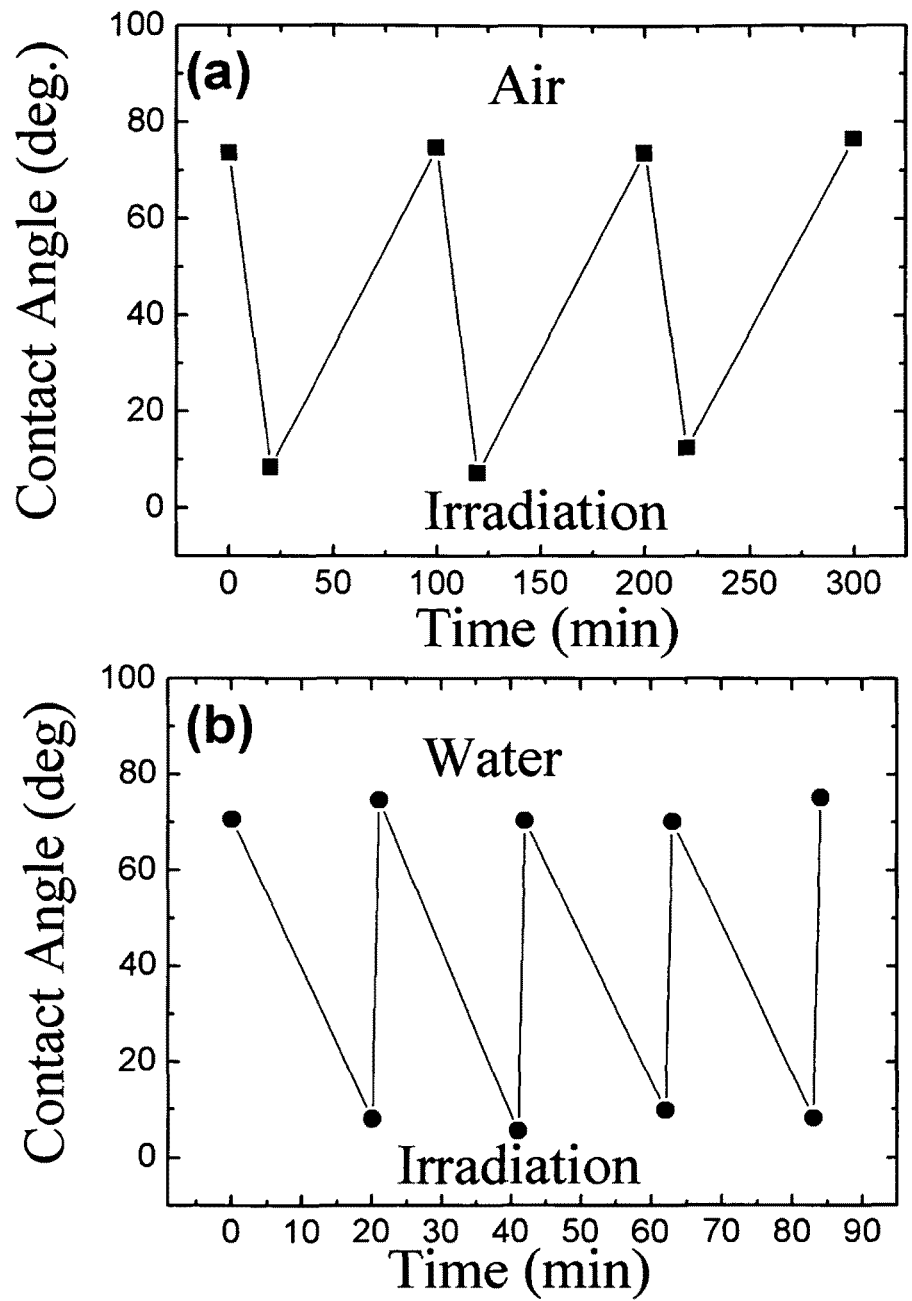
FIG. 4 shows reversible wettability transition of ZnO surface during repeated X-ray irradiation by storage in (a) ambient air condition and by immersion in (b) deionized water.

The wettability transition is reversible. We irradiated ZnO surface with X-ray for 20 min and immersed it in ambient condition for 80 min repeatedly. As shown in FIG. 4(a), the result provides evidence of the reversibility with little degradation after several switching cycles. When immersed in deionized water instead of ambient condition [FIG. 4(b)], the quick recovery rate obtained allows a rapid transition towards the original wettability. The reversible transition of the wettability is also observed in all the other inorganic materials tested (data not shown).

In conclusion, the present invention can provide a wettability modification by hard X-ray irradiation to a variety of inorganic materials. According to the present invention, the surfaces of all the tested inorganic materials show X-ray induced superhydrophilicity. The transition that follows an exponential evolution with the irradiation time is due to the accumulation of positive surface charges on the surface. The wettability quickly recovers to the initial state within several minutes of immersion in deionized water by discharging mechanism. The wettability transition is reversible and rapid. The present invention suggest that X-ray irradiation as a remote stimulus might be a useful wettability modification protocol for a variety of applications such as microfluidic device, smart windows, etc.

What is claimed is:

1. A method for modifying wettability of a surface of an inorganic material, the method comprising the steps of:
    preparing a solid inorganic material with a surface wherein the inorganic material is selected from the group consisting of p-Si, Sapphire, $SrTiO_3$, TiN, ZnS, and stainless steel;
    charging the surface of the solid inorganic material with surface charges obtained from photoelectron-emission by an X-ray irradiation in the range of 10 to 60 keV to the surface, wherein the charging of the surface increases the potential of the surface, thereby increasing the wettability of the surface; and
    discharging surface charges from the surface after the X-ray irradiation, wherein discharging the surface charges is performed by immersion of the surface of the inorganic material in deionized water.

2. The method as claimed in claim 1, wherein the X-ray irradiation is a synchrotron hard X-ray irradiation.

3. The method as claimed in claim 1, wherein the X-ray irradiation induces surface potential V(t) given by the following relation:

$$V(t) \approx V(\infty)[1-\exp(-t/\tau)] \quad (1)$$

where t is an X-ray irradiation time, V(∞) is an infinity potential, and τ is a time constant.

4. The method as claimed in claim 1, wherein the X-ray irradiation induces wetting behavior given by the following equation:

$$\cos\theta = \cos\theta_o + \frac{\varepsilon_i \varepsilon_o V(t)^2}{2\gamma_{lv} d} \quad (2)$$

where $\theta$ and $\theta_o$ are wetted and static contact angles, respectively, t is an X-ray irradiation time, $\in_i$ and $\in_o$ are dielectric permittivities of the inorganic material and vacuum, respectively, d is the thickness of the inorganic material, and $\in_{lv}$ is initial value of the liquid-vapor surface tension before X-ray irradiation.

5. The method as claimed in claim 1, wherein a relation between the wettability and the X-ray irradiation is given by the following:

$$\cos\theta \propto [1-\exp(-t/\tau)]^2 \quad (3)$$

where $\theta$ is a wetted contact angle, t is an X-ray irradiation time, and τ is a time constant.

* * * * *